(12) United States Patent
Heller et al.

(10) Patent No.: US 9,199,405 B2
(45) Date of Patent: Dec. 1, 2015

(54) APPARATUS FOR CONVEYING PREFORMS

(71) Applicant: KHS CORPOPLAST GMBH, Hamburg (DE)

(72) Inventors: Alexander Heller, Bargteheide (DE); Dieter Holler, Rümpel (DE)

(73) Assignee: KHS CORPOPLAST GMBH, Hamburg (DE)

( * ) Notice: Subject to any disclaimer, the term of this patent is extended or adjusted under 35 U.S.C. 154(b) by 0 days.

(21) Appl. No.: 14/406,484

(22) PCT Filed: Jun. 15, 2013

(86) PCT No.: PCT/EP2013/001776
§ 371 (c)(1),
(2) Date: Dec. 8, 2014

(87) PCT Pub. No.: WO2013/185931
PCT Pub. Date: Dec. 19, 2013

(65) Prior Publication Data
US 2015/0136565 A1    May 21, 2015

(30) Foreign Application Priority Data

Jun. 15, 2012    (DE) .......................... 10 2012 011 763

(51) Int. Cl.
*B65G 47/12*    (2006.01)
*B65G 11/16*    (2006.01)
(Continued)

(52) U.S. Cl.
CPC .......... *B29C 49/4205* (2013.01); *B65G 11/163* (2013.01); *B65G 37/00* (2013.01); *B29C 2049/4231* (2013.01); *B65G 2201/0247* (2013.01); *B65G 2812/081* (2013.01)

(58) Field of Classification Search
CPC ..................... B65G 2201/0247; B65G 11/163; B65G 37/00; B65G 37/005; B65G 47/1492; B65G 47/256; B65G 47/66; B65G 2812/081; B29C 49/4205; B29C 2049/4231
See application file for complete search history.

(56) References Cited

U.S. PATENT DOCUMENTS 4,076,071 A    2/1978    Rosenkranz et al.
5,346,386 A    9/1994    Albrecht et al.
(Continued)

FOREIGN PATENT DOCUMENTS

CH            698447 B1    8/2009
DE            2352926 A1    4/1975
(Continued)

*Primary Examiner* — Mark A Deuble
(74) *Attorney, Agent, or Firm* — Lucas & Mercanti, LLP; Klaus P. Stoffel

(57) ABSTRACT

An apparatus for conveying preforms to a blow molding machine, including a sorter that sorts and uniformly orients the preforms. A gravity conveyor feeds the preforms from the sorter to the blow molding machine. A transfer device between the sorter and the conveyor transfers the preforms from the sorter to the conveyor. The sorter, the conveyor, and the transfer device all have stepless adjoined guiding surfaces with specific contours that guide the preforms through the apparatus. The transfer device is an element with a curved guiding surface adjusted to the contour of the guiding surface of the sorter at the end facing the sorter, while being adjusted to the contour of the guiding surface of the gravity conveyor at the end facing the gravity conveyor. The two contours of the guiding surfaces facing the ends of the two devices are different, the guiding surface is stepless between the two ends.

10 Claims, 4 Drawing Sheets

(51) Int. Cl.
 *B29C 49/42* (2006.01)
 *B65G 37/00* (2006.01)

(56) References Cited

U.S. PATENT DOCUMENTS

| | | | |
|---|---|---|---|
| 5,516,274 A | 5/1996 | Maggert | |
| 5,648,026 A * | 7/1997 | Weiss | |
| 6,279,729 B1 * | 8/2001 | Simkowski | B65G 17/26 198/626.1 |
| 6,575,305 B1 * | 6/2003 | Casagrande | B07C 5/3404 198/455 |
| 7,556,137 B2 | 7/2009 | Charpentier | |
| 7,891,480 B2 | 2/2011 | Lemaistre et al. | |
| 8,337,193 B2 | 12/2012 | Brown | |
| 2004/0084285 A1 * | 5/2004 | Simkowski | B65G 51/035 198/836.1 |
| 2007/0114112 A1 * | 5/2007 | Guenther | B65G 21/2072 198/836.3 |
| 2009/0211880 A1 * | 8/2009 | Klaiber | B65G 15/14 198/470.1 |
| 2010/0108466 A1 * | 5/2010 | Herzog | B65G 47/256 198/400 |
| 2011/0031089 A1 | 2/2011 | Bianchini | |
| 2011/0198270 A1 * | 8/2011 | Beutl | B29C 49/4205 209/552 |
| 2015/0101909 A1 * | 4/2015 | Tanner | B29C 49/4205 198/550.01 |

FOREIGN PATENT DOCUMENTS

| | | |
|---|---|---|
| DE | 4212583 A1 | 10/1993 |
| DE | 4340291 A1 | 6/1995 |
| DE | 20308513 U1 | 7/2004 |
| DE | 102009016593 A1 | 10/2010 |
| EP | 0856392 A2 | 8/1998 |
| EP | 2065320 A1 | 6/2000 |
| EP | 1697236 B1 | 7/2009 |
| EP | 2221261 A1 | 8/2010 |
| WO | 2006125911 A2 | 11/2006 |
| WO | 2009138626 A2 | 11/2009 |
| WO | 2011138321 A1 | 11/2011 |

* cited by examiner

APPARATUS FOR CONVEYING PREFORMS

The present application is a 371 of International application PCT/EP2013/001776, filed Jun. 15, 2013, which claims priority of DE 10 2012 011 763.9, filed Jun. 15, 2012, the priority of these applications is hereby claimed and these applications are incorporated herein by reference.

BACKGROUND OF THE INVENTION

The present invention pertains to an apparatus for conveying preforms to a machine for the production of containers from a thermoplastic material, wherein the containers are formed by the action of a blowing pressure.

In the process of forming containers by the action of blowing pressure, preforms of a thermoplastic material such as preforms of PET (polyethylene terephthalate) are sent to various processing stations within a blow-molding machine. A blow-molding machine of this type typically comprises a heating device and a blowing device, in the area of which the previously tempered preform is expanded into a container by biaxial orientation. The expansion occurs by means of compressed air, which is introduced into the preform to be expanded. The course of the processing technology involved in a preform expansion of this type is explained in DE-OS 43 40 291. The basic configuration of a blow-molding station for forming containers is described in DE-OS 42 12 583. Possibilities for tempering the preforms are explained in DE-OS 23 52 926.

There are two alternative ways in which the preforms can be sent to the blow-molding machine. In the case of the so-called "one-step" method, the preforms are produced by an injection-molding process, and, immediately after they have been injection-molded, they are transported directly to the blow-molding machine by a conveying apparatus. In the case of the so-called "two-step" method, the preforms are first produced by an injection-molding process and then stored; they are conditioned with respect to their temperature and then blown into containers only at a later time. The production of the preforms and the blow-molding of the preforms into containers can take place at different times and at different places.

Both methods have in common that the preforms are sent to the blow-molding machine by a conveying apparatus. Known apparatuses consist of, for example, a vertical conveyor, by which the preforms, which are stored in a collecting bin, are transported to a conveying device. By means of the conveying device, usually a conveyor belt, the preforms are transported to a sorting device. This sorting device has the task of orienting the preforms into a defined position so that they can be transferred to, for example, a downline blow-molding machine. Known sorting devices (so-called roll sorters) consist, for example, of two conveying rolls, which rotate in opposite directions and between which a small gap remains, which is selected in such a way that the preforms can be held, suspended by their collars, between the rotating conveying rolls. The conveying rolls are arranged at an angle, so that the preforms slide down the incline, i.e., in the conveying direction, along the conveying rolls. The collar of the preform moves in the conveying direction along the preconfigured guide surfaces of the conveying rolls, the contour of these guide surfaces being in the form of part of a circle. "Contour" means here the form of the guide surface in the cross-sectional plane perpendicular to the conveying direction. Depending on the radius of the collar, the preform travels along the guide surface at a different level. The preforms are sorted, suspended between the rotating rolls, and transported in the conveying direction to a gravity conveying device, which follows the sorting device, and which also comprises a guide surface with a guide surface contour of a certain geometry, along which the sorted preforms are transported to the blow-molding machine.

There are essentially two different standard types of gravity conveying devices. First, a so-called "gravity rail" is frequently used, which is formed out of two parallel rails in such a way that a gap remains between them, in which the preforms can be transported in suspended fashion, wherein the gravity rail is configured in such a way that it comprises an incline, so that the preforms slide along the gravity rail by the force of gravity. The guide surface of the gravity rail can be described in a good approximation as a slanted plane; in this case the contour of the guide surfaces is then a straight horizontal line. The use of an air conveying section is also known as a gravity conveying device. Here, too, the preforms are conveyed in suspended fashion. Air conveying sections are usually arranged horizontally, and the preforms are conveyed by the action of streams of air, which accelerate the preforms. An example of an air conveying section of this type is described in WO 2011/138321 A1. Here too, the guide surface, along which the collars of the preforms are guided, is essentially a flat surface. Additional gravity conveying devices are also known from the prior art, however.

In the case of the known apparatuses, problems frequently occur in the area where the preforms are transferred from the sorting device to the gravity conveying device. The preforms are transferred from the sorting device to the gravity conveying device by way of a transfer device. A transfer device of this type known from the prior art is configured as a separate connecting element, for example, which is arranged between the sorting device and the gravity conveying device and is connected to both. At the gravity conveyor end, the connecting element comprises a guide surface contour, which adjoins the guide surface contour of the gravity conveying device.

When the preforms are being transferred, the preforms drop from the sorting device onto this stationary connecting element.

Depending on the type of container being produced, the geometry of the preforms can change; as a result, the preforms will follow a different path along the guide surface of the rolls of the roll conveyor, e.g., a path situated at a higher level. As a rule, it is therefore also necessary to adapt the connecting element to this changed situation. This suffers from the disadvantage that, each time there is a changeover from one type of preform to another, the connecting element must be readjusted to suit the type of preform in question, a process which is always time-consuming. The connecting element is also located in an area which is difficult to reach. The connecting element of known apparatuses, furthermore, is configured in such a way that the preforms drop several millimeters downward onto the connecting element. This frequently leads to a tipping or jamming of the preforms on the connecting element and, in association with that, to an interruption in the supply of preforms and in turn to the stoppage of the operation of the blow-molding machine.

SUMMARY OF THE INVENTION

The goal of the present invention is to create a transfer zone which makes it possible, during the transfer to the gravity conveying device, for the preforms to flow in a manner not susceptible to disruption.

The apparatus according to the invention for conveying preforms to, e.g., a blow-molding machine for the production of containers of a thermoplastic material comprises a sorting device, in which the preforms are sorted as to their orientation; a gravity conveying device arranged at the gravity end of the sorting device, by means of which the preforms, after sorting, are supplied to the blow-molding machine; and a transfer device, which is arranged between the sorting device and the gravity conveying device and by means of which the preforms are transferred from the sorting device to the gravity conveying device. The sorting device, the gravity conveying device, and the transfer device each comprise guide surfaces with guide surface contours, wherein, according to the invention, these guide surfaces adjoin each other in an essentially stepless manner. The preforms are guided through the apparatus by means of this guide surface, which is, overall, essentially stepless. According to the invention, the transfer device is configured as a separate transfer element comprising a curved guide surface, the shape of which, at the end facing the sorting device, is adapted to the guide surface contour of the sorting device, whereas, at the end facing the gravity conveying device, its shape is adapted to the guide surface contour of the gravity conveying device, wherein the two guide surface contours at the ends differ from each other, and wherein the guide surface between these two ends extends in a stepless manner, in that the contour changes continuously from one end to the other. The "adaptation" of the shape in this context means that, at the points where the transfer element adjoins the adjacent guide surfaces, a disruption-free transfer is guaranteed, because the adjacent contours are so similar to each other that no large steps are present. The contours can even be identical, although this is not mandatory.

The present invention offers the advantage that, through the provision of the transfer element according to the invention, the preforms are guided more-or-less continuously along a guide surface. Because the end of the transfer element facing the sorting device conforms to the guide surface contour of the sorting device, it is automatically ensured that, independently of the actual path of movement of the preform, the preform will be transferred continuously to the transfer element and thus to the gravity conveying device. There is no longer any need for the cumbersome readjustment of the apparatus to different types of preforms, which leads to an advantageous savings of time.

According to an advantageous embodiment of the invention, the sorting device is a so-called "roll sorter". At the end facing the sorting device, the shape of the transfer element is therefore adapted to the guide surface contour of the guide surface of the rolls, which is in the form of part of a circle, and thus also comprises a guide surface contour forming part of a circle with an identical or essentially identical radius.

According to another advantageous embodiment of the invention, the transfer element consists of a connecting element and a retrofitted transfer element. At the sorting end, this retrofitted transfer element is contoured essentially like the guide surface of the sorting device, whereas, at the gravity conveyor end, it is contoured like the guide surface of the connecting element. In this way, existing apparatuses can be easily retrofitted.

It is also proposed that the transfer element be arranged in a stationary manner with respect to the conveying rolls. The distance between the conveying rolls is occasionally to be changed as a function of the geometry of the preform type in question. The configuration according to the invention offers the advantage that, when the rolls are to be adjusted, the transfer element, which is in a stationary position relative to them or is arranged on them, always shifts its position along with the rolls, and thus the selected shape adaptation of the guide surface contours between the sorting device and the transfer element remains preserved and there is no need to readjust the transfer element.

As an alternative, the transfer element could be configured so that it does not accompany the adjusting movement of the rolls; that is, it always remains in the same position. In this case, it is advantageous for the sorting-end guide surface contour of the transfer element to deviate from the exact roll contour and to be shaped in such a way that, in the case of the extreme positions which the conveying rolls can assume for the standard types of preforms, a transfer will still always occur with a small step. This guide surface contour could be, for example, a guide surface contour arrived at as an average between the guide surface contours found to be optimal for the associated roll positions.

As previously mentioned in the introduction, it is known that two different gravity conveying devices are usually used to the convey the preforms. Accordingly, in further embodiments of the invention, the gravity conveying device can be a gravity rail.

The use of an air transport section or other possible conveying devices is also conceivable.

The invention is explained in greater detail below on the basis of several figures:

DETAILED DESCRIPTION OF THE INVENTION

Figure 1:
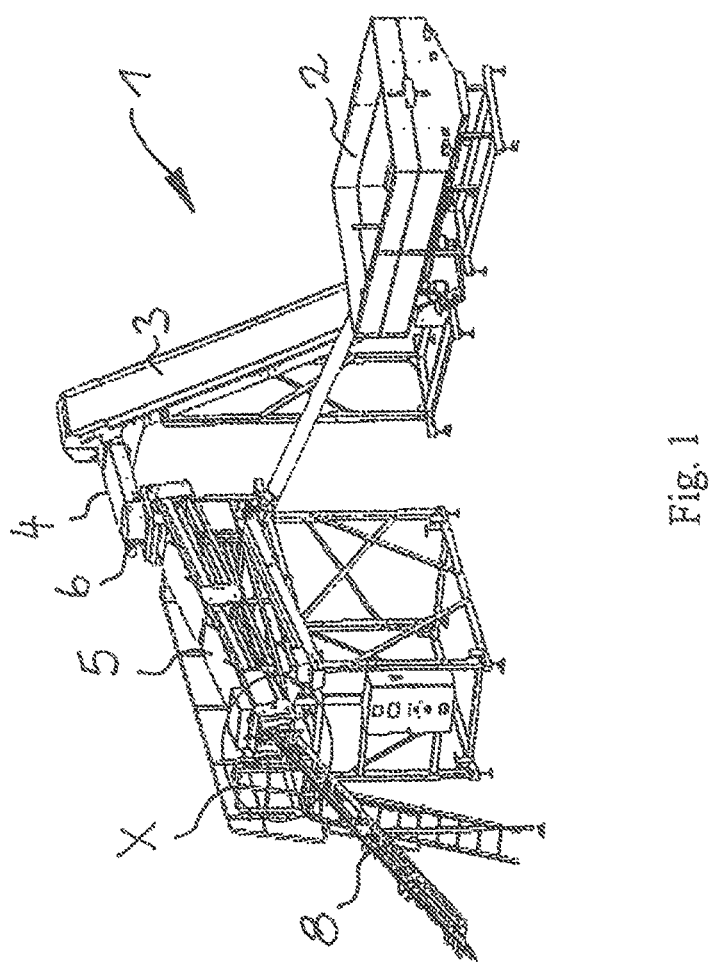
FIG. 1 shows an apparatus for conveying preforms to a blow-molding machine for the production of containers from a thermoplastic material.

FIG. 1 shows an apparatus 1 for conveying preforms to, for example, a blow-molding machine for the production of PET bottles. The apparatus consists of a collecting bin 2, in which a supply of preforms is provided. From the collecting bin 2, the preforms are conveyed by a vertical conveyor 3 to the feed end of a conveying device 4. The other end of the conveying device 4, i.e., its discharge end, is arranged above a sorting device 5, wherein a feed device 6 is provided between the conveying device 4 and the sorting device 5 to ensure the orderly transfer of the preforms with a minimum of disruption. From the sorting device 5, the sorted preforms travel onward to a gravity conveying device 8, by means of which the preforms are conveyed into the blow-molding machine (not shown).

Figure 2:
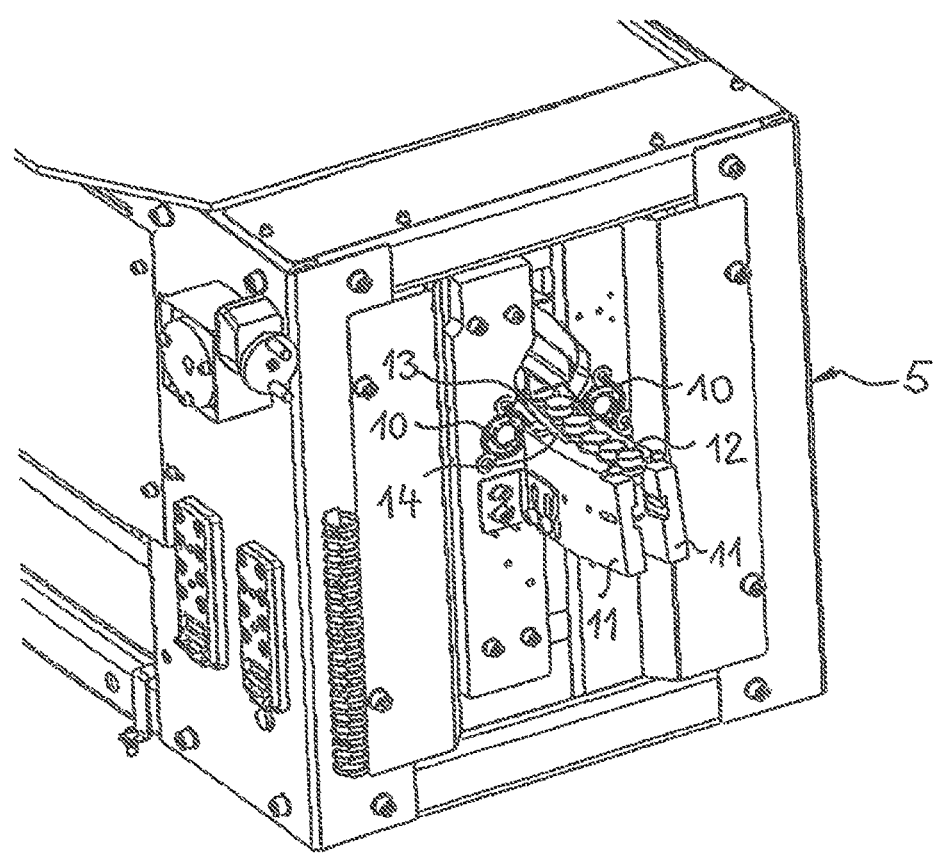
FIG. 2 shows an isometric view of the detail marked "X" in FIG. 1, which pertains to the transfer zone between the sorting device and the gravity conveying device.

FIG. 2 shows an isometric view of the discharge area of the sorting device 5. The sorting device 5 comprises two conveyor rolls 10, which are parallel to each other and separated from each other by a gap. In the gap, the preforms 12, which usually comprise a collar, are transported in suspended fashion. A two-part connecting element 11 is fastened to the sorting device 5; this connecting element also has a gap, in which the preforms 12 can be transported in suspended fashion. To the connecting element 11, the transfer element 13 is attached, which consists of two parts, comprising a guide surface 14, along which the preforms slide in the direction toward the connecting element 11. If a stationary attachment relative to the conveying rolls is desired, the transfer element 13 can be mounted on the brackets 16, on which the conveying rolls 10 are also supported.

Figure 3:
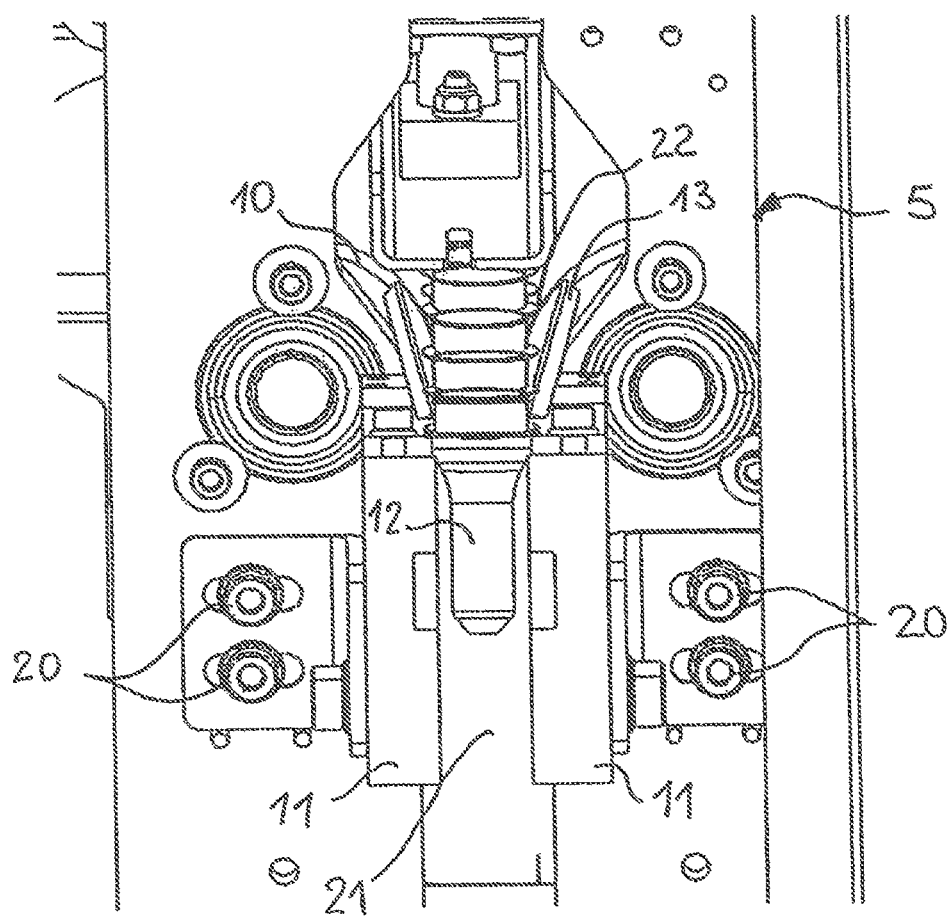
FIG. 3 shows a front view of the detail marked "X" in FIG. 1.

FIG. 3 shows a front view of the detail marked "X" in FIG. 1. It is possible to see the sorting device 5 and the two-part connecting element 11, fastened by screw joints 20 to the sorting device 5. Between the two parts of the connecting element 11 there is a gap 21, in which the preforms 12 are transported in suspended fashion. The transfer element 13, consisting of two parts, is mounted on the connecting element 11, wherein the transfer element 13 comprises a guide surface 22 with curvature in three dimensions.

FIG. 3 shows the transport of several preforms 12 arranged in a row, coming from the sorting device and proceeding toward the gravity conveying device. As a result of the guide surface 22 provided on the transfer element 13, the preforms 12 slide continuously, without any significant discontinuities, along the connecting element 11 to the gravity conveying device (not shown).

Figure 4:
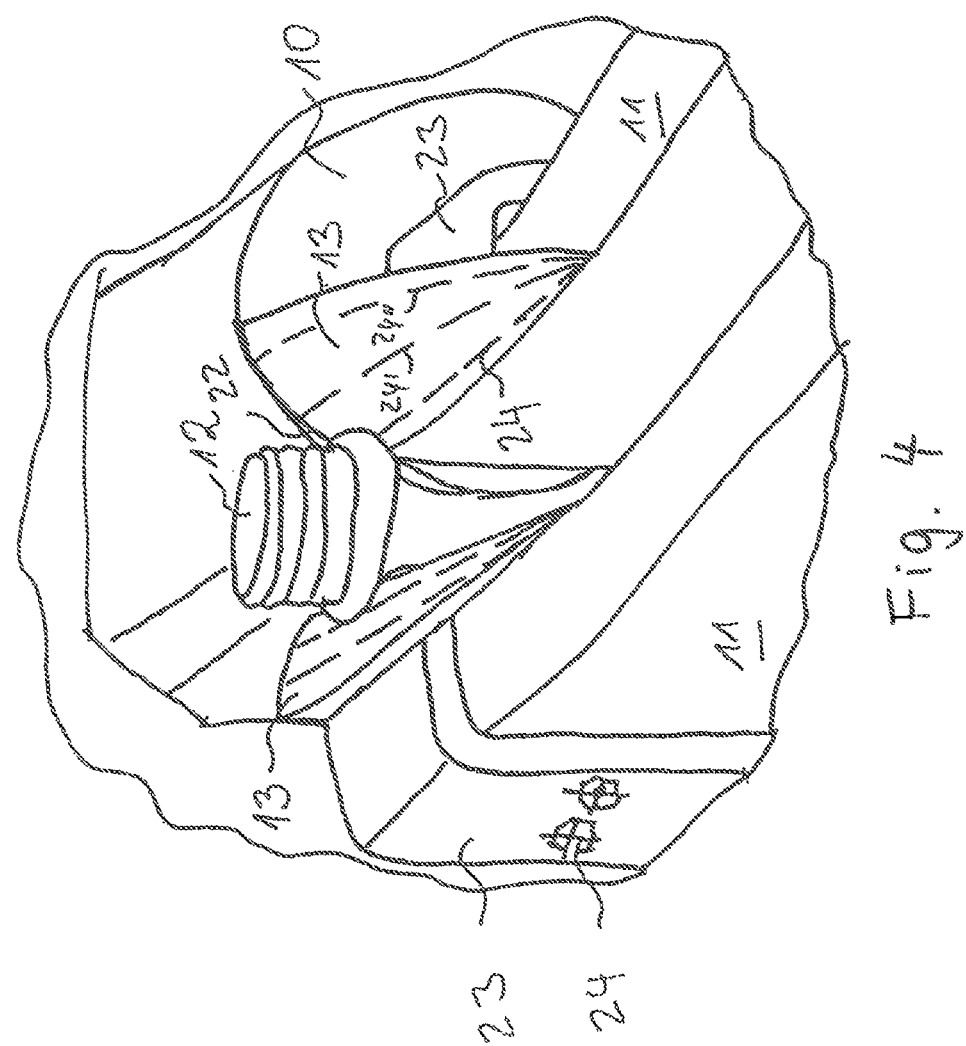
FIG. 4 shows a schematic diagram of the arrangement of a transfer element according to the invention.

FIG. 4 shows a detailed view of the arrangement and configuration of an exemplary embodiment of a transfer element of an apparatus according to the invention.

The transfer element 13 is arranged on the connecting element 11 and is fastened by connecting tabs 23 and screw joints 24 to the connecting element 11. For the guidance of the preforms, the transfer element 13 is configured at the end facing the sorting device in such a way that its shape is adapted to the upper periphery of the conveying roll 10. The guide surface 22 is configured in such a way that it begins at the upper periphery of the conveying roll 10 and extends in an arc to the connecting element 11, wherein the arc is configured so that it makes possible a sliding, disruption-free transfer from the conveying roll 10 to the transfer element 13. At the bottom end, the transfer element 13 is formed with a tapered point, wherein the point is shaped so that a sliding, disruption-free transfer from the transfer element 13 to the connecting element 11 can be realized.

In its middle area, the guide surface 22 of the transfer element is contoured in such a way that the preform 12 slides over a guide path 24 extending between the upper and the lower end toward the connecting element 11 and the gravity conveying device. As a function of the geometry, what results on the basis of the configuration of the guide 22 are various guide paths 24', 24", which share the common feature that the preforms 12 are guided on them from the sorting device to the connecting element 11 without disruption.

The invention claimed is:

1. An apparatus for conveying preforms to a blow-molding machine for producing containers from a thermoplastic material, comprising:
    a sorting device in which the preforms are sorted with respect to orientation;
    a gravity conveying device arranged at a discharge end of the sorting device to feed the preforms to the blow-molding machine; and
    transfer device, arranged between the sorting device and the gravity conveying device, to transfer the preforms from the sorting device to the gravity conveying device; wherein the sorting device, the conveying device, and the transfer device each comprise guide surfaces with guide surface contours over which the preforms are guided through the apparatus, wherein the guide surface contours adjoin each other in a substantially stepless manner, the transfer device being configured as a transfer element with a curved guide surface having a shape at a sorting device end adapted to the guide surface contour of the sorting device, and having a shape at a gravity conveying device end adapted to the guide surface contour of the gravity conveying device, wherein the two end-side guide surface contours differ from each other, and the guide surface of the transfer element extends between the two ends in a stepless manner.

2. The apparatus according to claim 1, wherein the sorting device is a roll sorter.

3. The apparatus according to claim 1, wherein the transfer element consists of a connecting element and a retrofitted transfer element.

4. The apparatus according to claim 1, wherein the transfer element is configured in two parts.

5. The apparatus according to claim 2, wherein the sorting device includes conveying rolls, and the transfer element is arranged in a stationary position relative to the conveying rolls.

6. The apparatus according to claim 3, wherein the connecting element comprises a guide surface that is contoured at the gravity conveying device end with a shape adapted to the guide surface contour of the gravity conveying device.

7. The apparatus according to claim 6, wherein the guide surface of the transfer element is contoured at a connecting element end with a shape adapted to the guide surface contour of the connecting element.

8. The apparatus according to claim 1, wherein the transfer element comprises a guide surface configured so that preforms with different geometries are guided from the sorting device to the gravity conveying device along different, continuous, and stepless guide paths.

9. The apparatus according to claim 1, wherein the gravity conveying device is a gravity rail.

10. The apparatus according to claim 1, wherein the gravity conveying device is an air conveyor section.

* * * * *